W. J. Woodside,

Jar Trap.

No. 77,341. Patented Apr. 28, 1868.

Witnesses:

W. C. Ashkettle

J. A. Fraser

W. J. Woodside per Munn & Co attorneys

N. PETERS, PHOTO-LITHOGRAPHER, WASHINGTON, D. C.

United States Patent Office.

WILLIAM J. WOODSIDE, OF ZANESVILLE, OHIO.

*Letters Patent No.* 77,341, *dated April* 28, 1868.

IMPROVED ANIMAL-TRAP.

The Schedule referred to in these Letters Patent and making part of the same.

TO ALL WHOM IT MAY CONCERN:

Be it known that I, WILLIAM J. WOODSIDE, of Zanesville, in the county of Muskingum, and State of Ohio, have invented a new and useful Improvement in Animal-Traps; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved self-setting trap, simple in construction, not liable to get out of order, and effective in operation, instantly killing the animal that springs the trap; and it consists in the construction, combination, and arrangement of the various parts, as hereinafter more fully described.

Figure 2:
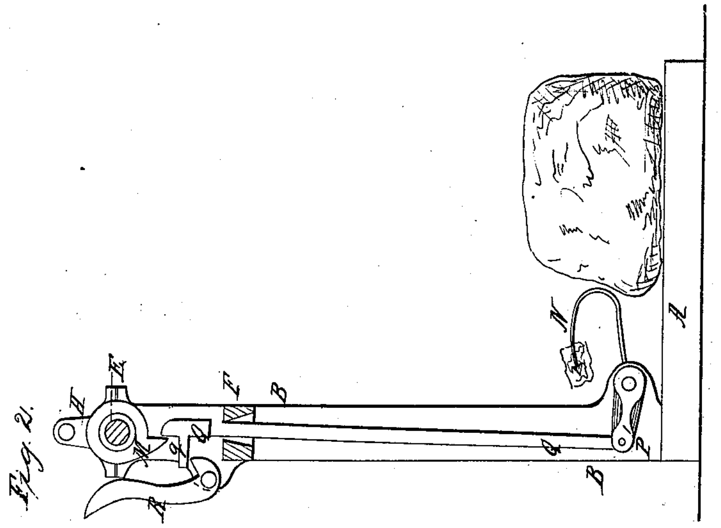
Figure 2 is a vertical section of the same, taken through the line *x x*, fig. 1.
Figure 1:
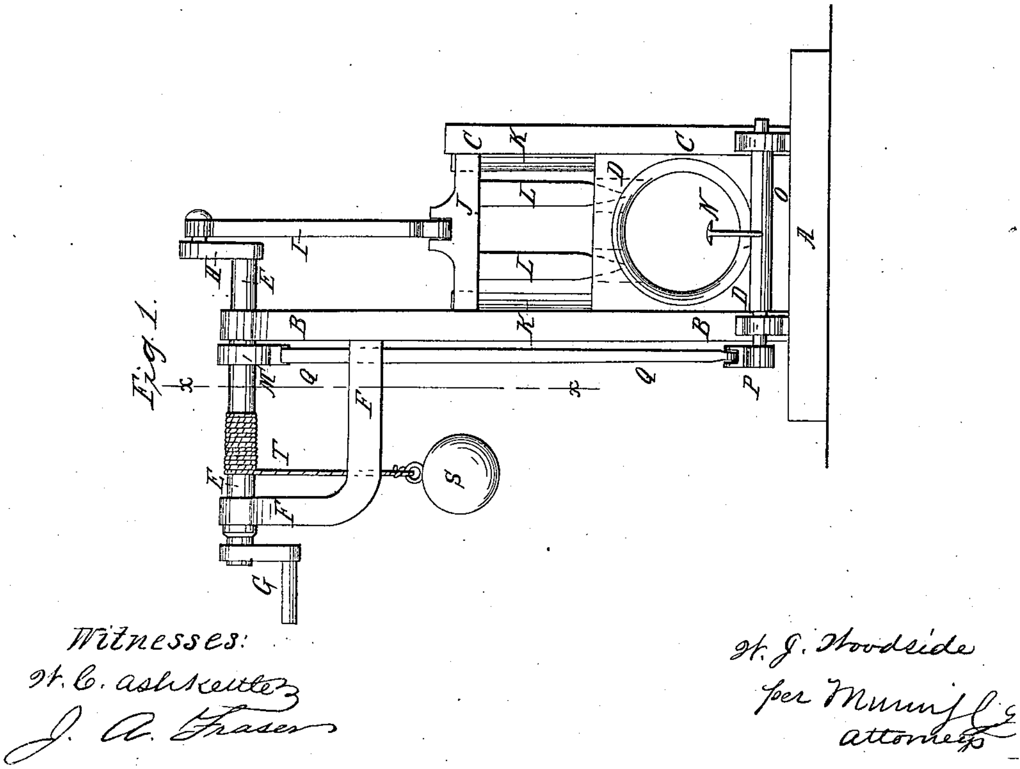
Figure 1 is a rear view of my improved trap.

A is the base of the trap, which should be made sufficiently large and heavy to balance the operating parts of the trap, or to receive a weight to balance said parts. B and C are two uprights, the lower ends of which are securely attached to the forward part of the base-board A, and the lower parts of which are connected by or formed solid with the plate D, having a hole through it of sufficient size to allow the animal to pass his head through it to reach the bait. E is a shaft, revolving in bearings in the upper end of the upright, B, and in the upper end of the bent arm F, the lower end of which is attached to the upper part of the said upright, B, as shown in fig. 1. To the outer end of the shaft E is attached a crank, G, for operating the shaft to wind up the weight or spring by which the knives are operated.

To inner end of the shaft E is attached a crank, H, to the crank-pin of which is pivoted the upper end of the connecting-rod I, the lower end of which is pivoted to the block J, which slides up and down upon the slides K, attached to the inner side of the uprights B and C. To the lower side of the sliding block J are attached two or more knives L, which work up and down through holes or slots in the upper part of the plate D, in such positions as to pass through the neck of the animal whose head may be through the hole in said plate trying to get the bait. To the shaft E, upon the outer side of the upright, B, is attached a cam or single-toothed ratchet-wheel, M. N is the bait-hook, which is rigidly attached to a short horizontal shaft, O, which is placed at the rear side of the lower ends of the uprights B and C. P is a crank attached to the end of the journal of the shaft O, and to which is pivoted the lower end of the trigger-bar Q, which passes up through a guide-hole in the arm F into such a position as to catch upon the shoulder of the cam-wheel M to set the trap. R is a hook or bent lever, which is pivoted to the outer side of the upright, B, in such a position that its hook or short arm may catch upon a projection, *q*, formed upon the upper part of the bar Q, and its long arm may extend upward into such a position that as the shaft E revolves, the cam M may strike against the said long arm and push it back, raising the trigger-bar Q, so that the said arm M may catch upon it and again set the trap. S is a weight, to which is attached one end of the cord T, the other end of which is attached to and wound around the shaft E, so that as the trigger-bar is withdrawn, the said weight may operate the knives to kill the animal. If desired, motion may be given to the shaft E by a spring attached to and coiled around said shaft. The bait-hook should be surrounded with a net-work or grating, so that the animal can only reach the bait by putting his head through the hole in the plate D, and thus bringing his neck directly beneath the knives L. Then, as the animal pulls upon the bait and moves the bait-hook, he withdraws the trigger-bar Q from the cam M of the shaft E, allowing the said shaft to revolve, thrusting the knives L down through the neck of the animal, instantly killing him. As the shaft E continues its revolution, the knives L are so quickly withdrawn that no blood will adhere to them, and as the cam M comes round to its former position, it strikes the long arm of the bent or hook lever R, raising the trigger-bar Q into a position to receive the cam M and again set the trap.

I claim as new, and desire to secure by Letters Patent—

1. The combination of the perforated plate D, knives L, sliding block J, connecting-rod I, crank H, and shaft E, with each other, whether said shaft is operated by a weight or spring, substantially as herein shown and described, and for the purpose set forth.

2. The combination of the bait-hook N, short shaft *o*, crank P, and trigger-bar Q, with each other, and with the cam M upon the shaft E, for the purpose of tripping the trap, substantially as herein shown and described.

3. The combination of the bent or hook lever R with the cam M and trigger-bar Q, for the purpose of setting the trap, substantially as herein shown and described.

WM. J. WOODSIDE.

Witnesses:

GEO. D. GIBBONS,

C. SMALSREED.